United States Patent
Bryant

(10) Patent No.: US 7,019,217 B2
(45) Date of Patent: Mar. 28, 2006

(54) COLLET-TYPE SPLICE AND DEAD END USE WITH AN ALUMINUM CONDUCTOR COMPOSITE CORE REINFORCED CABLE

(75) Inventor: David Bryant, Laguna Beach, CA (US)

(73) Assignee: CTC Cable Corporation, Irvine, CA (US)

( * ) Notice: Subject to any disclaimer, the term of this patent is extended or adjusted under 35 U.S.C. 154(b) by 0 days.

(21) Appl. No.: 10/911,072

(22) Filed: Aug. 4, 2004

(65) Prior Publication Data

US 2005/0006129 A1    Jan. 13, 2005

Related U.S. Application Data

(63) Continuation-in-part of application No. 10/690,839, filed on Oct. 22, 2003, which is a continuation-in-part of application No. PCT/US03/12520, filed on Apr. 23, 2003.

(60) Provisional application No. 60/374,879, filed on Apr. 23, 2002.

(51) Int. Cl.
*H02G 3/06* (2006.01)
(52) U.S. Cl. .................................................. 174/88 R
(58) Field of Classification Search ............. 174/88 R, 174/84 C, 84 R, 74 R; 439/863, 877
See application file for complete search history.

(56) References Cited

U.S. PATENT DOCUMENTS

| | | | |
|---|---|---|---|
| 2,988,727 A * | 6/1961 | Berndt | ........................ 439/863 |
| 3,184,535 A | 5/1965 | Worthington | |
| 4,496,212 A | 1/1985 | Harvey | |
| 5,821,459 A | 10/1998 | Cheenne-Astorino et al. | |

FOREIGN PATENT DOCUMENTS

| | | |
|---|---|---|
| EP | 1124235 A2 | 8/2001 |
| EP | 1168374 A2 | 1/2002 |

OTHER PUBLICATIONS

3M, "Aluminum Conductor Composite Reinforced Technical Notebook (795 kcmil family) Conductor and Acessory Testing", Apr. 2003, pp. 1-22.

* cited by examiner

*Primary Examiner*—Chau Nguyen N.
(74) *Attorney, Agent, or Firm*—The McIntosh Group

(57) ABSTRACT

This invention relates to collet-type splices and collet-type dead ends and methods for splicing together two aluminum conductor composite core reinforced cables (ACCC) or terminating one ACCC cable. The collet-type fittings use a collet inside a collet housing to hold the composite cores. The composite cores can be stripped of the aluminum conductor to provide a bond between the collet and the composite core. After inserting the composite core into the collet, a compression implement compresses the collet. The collet holds the composite core with frictional forces and the collet further compresses and strengthens the hold on the composite core if the composite core pulls the collet further into the collet housing.

35 Claims, 8 Drawing Sheets

COLLET-TYPE SPLICE AND DEAD END USE WITH AN ALUMINUM CONDUCTOR COMPOSITE CORE REINFORCED CABLE

CROSS REFERENCES TO RELATED APPLICATIONS

In relation to this Continuation in Part Application, applicants claim priority of earlier U.S. CIP application Ser. No. 10/690,839 filed in the United States Patent and Trademark Office on 22 Oct. 2003, which is incorporated by reference herein and which is a continuation in part of and claims priority from earlier PCT filing PCT/US03/12520 filed in the International Receiving Office of the United States patent and Trademark Office on 23 Apr. 2003, the entire disclosure of which is incorporated by reference herein, which claims priority from U.S. provisional application Ser. No. 60/374,879 filed in the United States patent and Trademark Office on 23 Apr. 2002, the entire disclosure of which is incorporated by reference herein.

STATEMENT REGARDING FEDERALLY SPONSORED RESEARCH OR DEVELOPMENT

Not Applicable

REFERENCE TO A "MICROFICHE APPENDIX"

Not Applicable

BACKGROUND OF THE INVENTION

1. Field of the Invention

The present invention relates to apparatuses and methods to splice and terminate electrical cables. More particularly, the invention relates to several fittings capable of joining two composite core cables by the load bearing composite cores and to several fittings that can terminate or dead end the composite core cables.

2. Description of the Related Art

The blackouts in 2003 that affected the United States, Great Britain, and France have demonstrated an urgent need to update the world's power grids. An elegant and immediate solution is the replacement of existing conductors with composite core reinforced cables. An example of a composite core reinforced cable, the ACCC cable, is described in PCT Application No. PCT/US03/12520, which is incorporated by reference herein. Hereinafter, the ACCC cable will be used to represent all composite core cables. These ACCC cables provide a greatly increased ampacity. In some situations, the ACCC cable may provide a 100% increase in ampacity. Replacing antiquated cables with ACCC cables is an obvious and effective method for increasing the capabilities of the world's electrical transmission and distribution systems. To replace the outdated cables, linemen will need to install the ACCC or other composite core cables onto existing structures.

Unfortunately, current methods and devices to install these cables do not exist. To install the ACCC cables, the linemen must be able to splice the cables and attach the cables to poles or structures using dead ends. Unfortunately, existing devices and methods will not be effective.

While cable lengths for a single strand of ACCC cable may cover several thousand feet, a power grid requires several hundred or thousand miles of cable. To span these distances, the linemen must splice or couple two smaller cable spans together. The splice functions as both a mechanical junction that holds the two ends of the cables together and an electrical junction allowing the electric current to flow over or through the splice.

With the traditional aluminum conductor steel reinforced cable (ACSR), the cable is formed from a set of twisted aluminum conductors wrapped around a core of steel wires. The aluminum conductor mostly functions as the electrical conductor, while the steel core mostly functions as the load-bearing member. The aluminum conductor does carry some of the load, and the steel core does help conduct some of the electric current. To splice two ACSR cable spans, linemen use a device such as a full tension compression splice. Hubbell/Fargo Manufacturing, of Poughkeepsie, N.Y., offer these types of splices. For this device, a lineman strips the aluminum away from the steel core. A sleeve or die is placed over the end of the exposed core. The lineman leaves a small part of the steel core exposed beyond the end of the sleeve. A compression vise is used to affix the sleeve to the steel core. The sleeve and steel core from both cables are then inserted into a second tube. The tube is long enough to cover the sleeve and part of the aluminum conductor that was not stripped away. This tube is also crimped with a compression vise. These implements create compression fittings that hold both the aluminum conductor and the steel core.

The method just described works well with ACSR cables, but is ineffective with ACCC cables. First, the aluminum conductor is not a load bearing member in the ACCC cable. Thus, crimping a tube to the aluminum conductor does not hold together the composite core load-bearing members of the two cables. In addition, the exceptional crimping force used, around 60 tons psi, could crush the composite core. Thus, the methods used for ACSR cables are flawed because the methods do not provide a good mechanical coupling between the load-bearing members of the ACCC cables.

In the composites industry, composite members are often adhered together. A special glue, epoxy, or adhesive is applied to the composite and to the member being affixed to the composite. Unfortunately, several problems occur with these adhesive bonds. First, adhesives do not spread the forces applied to the bond across the entire area of the bond. Rather, forces tend to localize along one or two inches of the bond. With the incredible tensional forces on the cables (up to 60,000 pounds or more), the adhesive bonds tend to fail in successive one inch regions until the entire bond is compromised. Also, bonding to a composite member tends to apply forces to the outer fibers in the composite. Thus, as forces build, the fibers on the exterior of the composite fail, and then the bond fails also. To compensate, some composite manufacturers slice the composites lengthwise along an acute angle. Then, the two sliced composites are bonded along the slice. This bond distributes the forces along all the fibers not just those on the exterior of the composite. Unfortunately, the composite core of an ACCC cable is small. Making the slices in these cores would be extremely difficult. In addition, bonding the composites would require special tools, materials, and training beyond that a lineman currently enjoys. The use of adhesives in the field is also difficult because of environmental pollutants, such as moisture, dust, and other airborne materials, that can affect the proper mixing and setting of the adhesives.

To terminate a cable, a lineman normally installs a dead end. Similar devices and methods to the splice are used in the industry to install dead ends. Thus, the same problems mentioned above exist for dead ends also.

Thus, there exists a need for a cable splice for ACCC reinforced cables and other composite core cables, and there exists a need for a cable dead end for these composite core cables.

BRIEF SUMMARY OF THE INVENTION

ACCC reinforced cables provide a utility or power supplier with superior properties. Increased ampacity can be achieved by using an ACCC cable. With the advantages provided by ACCC cables, utilities are turning to ACCC reinforced cables to update and improve outdated transmission and distribution cables. Unfortunately, methods and systems to install these cables have yet to be created. The present invention provides collet-type fittings both to splice two ACCC cables together and to terminate the ACCC cables. In addition, the present invention provides methods to splice and terminate the ACCC cables.

A collet-type fitting uses a collet inside a collet housing to hold the composite cores. The composite core cables can be stripped of the aluminum conductor to provide the best bond between the collet and the composite core, which is the load-bearing member of the cable. After inserting the composite core into the collet, a compression implement may be used to compress the collet against the composite core. The shape of the collet housing forces the collet to increase the compressive force as it moves further into the collet housing. These compressive forces create enormous friction bond between the collet and the composite core. The friction bond holds the composite core to the collet. The compression fitting can be covered by an aluminum housing to transfer the electric current over the splice. This compression fitting enables a good mechanical and electrical junction.

The dead ends apply the same type device and method. The dead ends and splices and other features of the invention are best understood by referring to the detailed description of the invention, read in light of the accompanying drawings

BREIF DESCRIPTION OF THE SEVERAL VIEWS OF THE DRAWINGS

Figure 1:
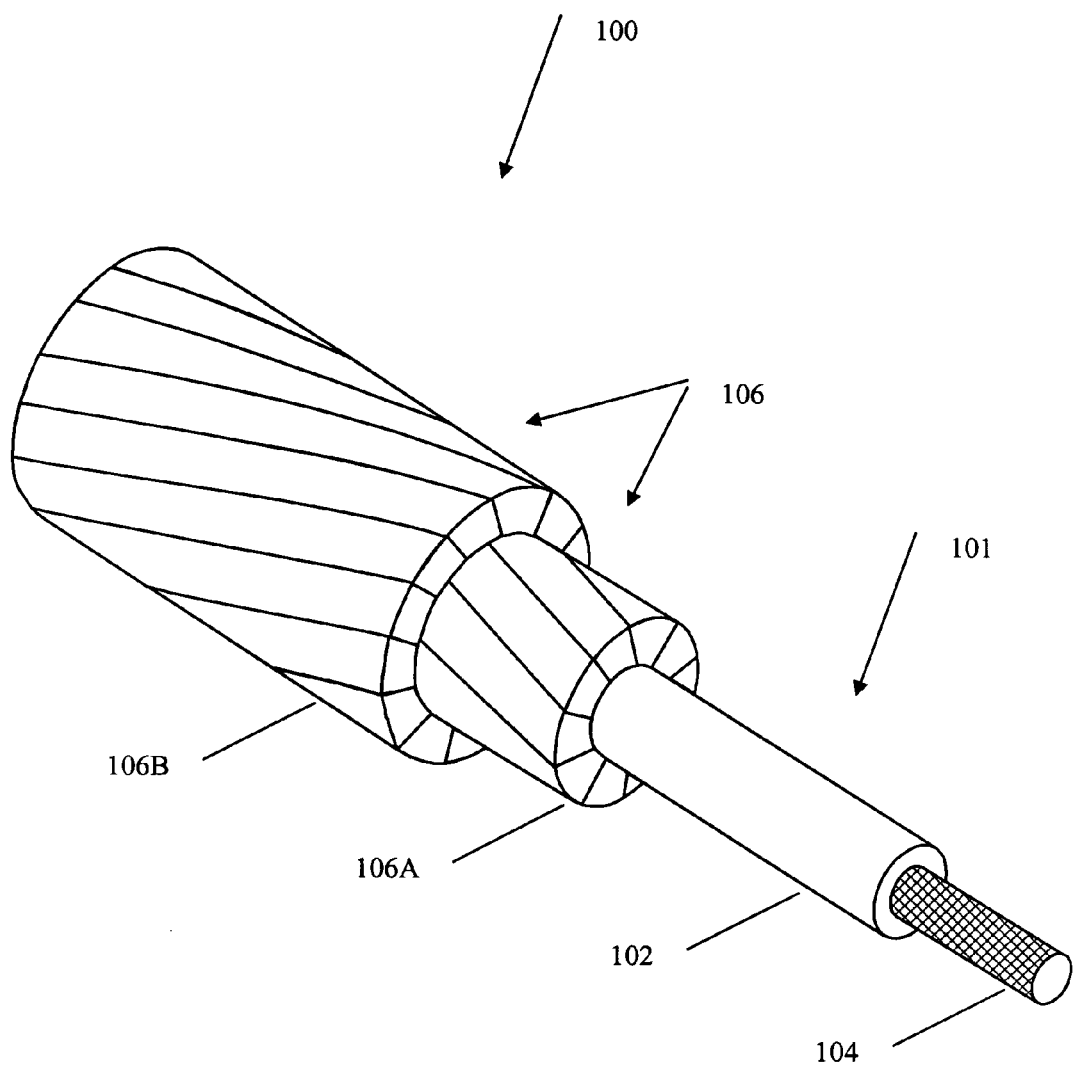
FIG. 1 is a three dimensional view of an embodiment of a composite core reinforced cable.
Figure 3:
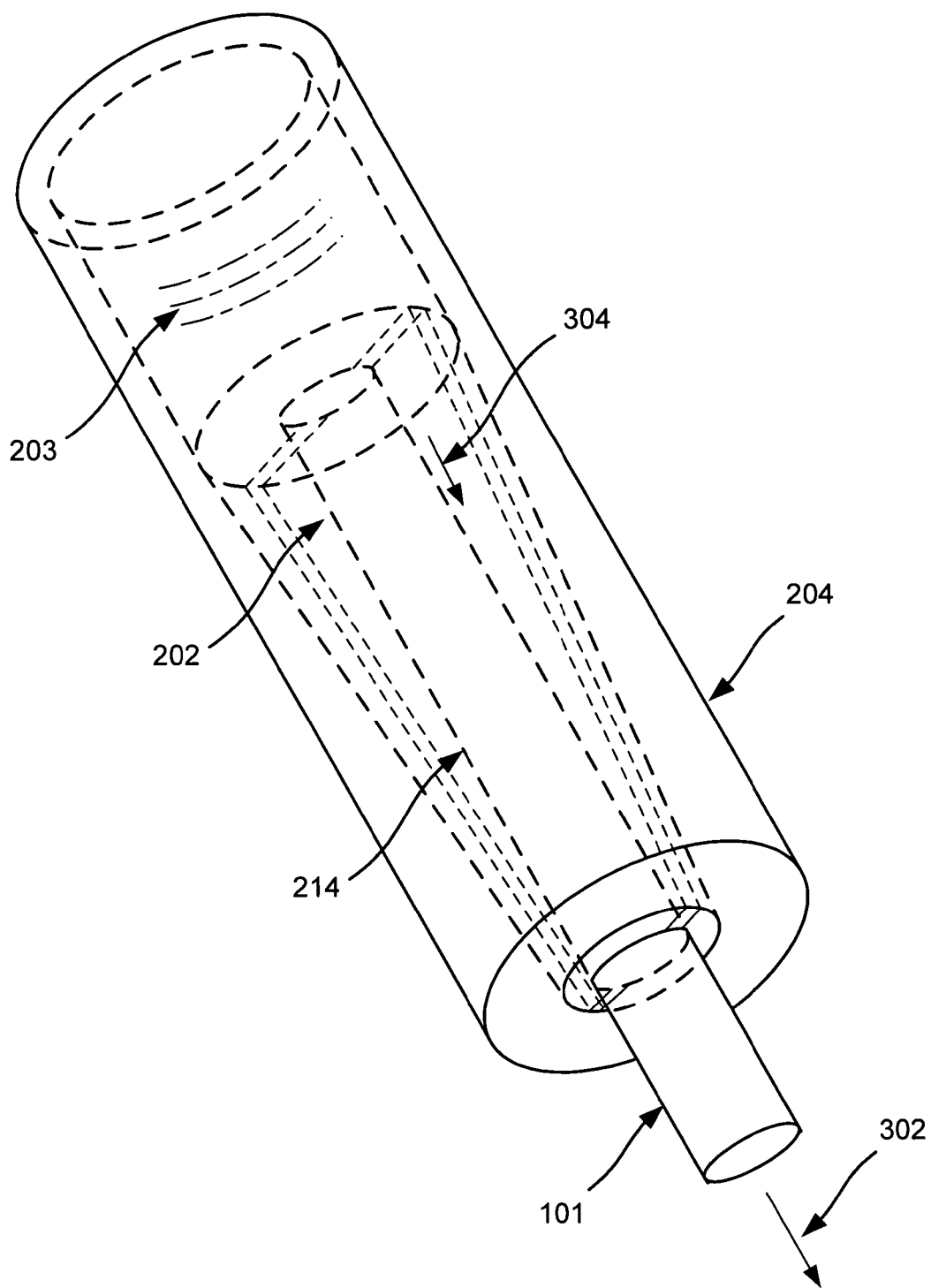
FIG. 3 is a three-dimensional view of a collet and a collet housing according to the present invention.

To clarify, each drawing includes reference numerals. These reference numerals follow a common nomenclature. The reference numeral will have three or four digits. The first one or two digits represent the drawing number where the reference numeral was first used. For example, a reference numeral first used in drawing one will have a number like 1XX, while a number first used in drawing five will have a number like 5XX. The second two numbers represent a specific item within a drawing. One item in drawing 1 will be 101 while another item will be 102. Like reference numerals used in other drawings represent the same item. For example, reference numeral 102 in FIG. 3 is the same item as shown in FIG. 1.

DETAILED DESCRIPTION OF THE INVENTION

The present invention will now be described more fully hereinafter with reference to the accompanying drawings, in which exemplary embodiments of the invention are shown. This invention may, however, be embodied in many different forms and should not be construed as limited to the embodiments set forth herein. Rather, these embodiments are provided so that the disclosure will fully convey the scope of the invention to those skilled in the art. The drawings are not necessarily drawn to scale but are configured to clearly illustrate the invention. The invention is as set forth in the claims. Throughout this description, the term "couple", "couples", or "coupled" means any type of physical attachment or connection of two parts.

The present invention relates to methods and apparatuses to splice together two composite core 101 reinforced cables. FIG. 1 illustrates one embodiment of an ACCC reinforced cable 100. FIG. 1 illustrates an ACCC reinforced cable 100 having a reinforced carbon fiber/epoxy resin composite inner core 104 and a reinforced glass fiber/epoxy resin composite outer core 102, surrounded by a first layer of aluminum conductor 106A, wherein a plurality of trapezoidal shaped aluminum strands wrap around the composite core 101, and surrounded by a second layer of aluminum conductor 106B wherein a plurality of trapezoidal shaped aluminum strands wrap around the first aluminum layer 106A. For this description, the splice and dead end fittings will be explained using this one embodiment of the composite core 101 cable 100 as an example. However, the splice and dead end fittings may be used with any embodiment of composite core reinforced cables 100.

To determine how to make the splice or dead end, an understanding of the forces affecting the cable 100 is needed. All explanations that follow apply to an ACCC cable that is equivalent to a Drake style ACSR cable. For this type of cable 100, the required tensional force a splice must maintain a minimum of 95% of the cable's rated strength. In the case of a Drake sized ACCC cable, which has a strength rating of 40,000 pounds, the 95% minimum is approximately 38,950 pounds. Thus, the splice should be able to maintain a tensional force of around 40,000 pounds. In a frictional fitting explained below, the splice or dead end counteract the tensional force by making a frictional coupling between the fittings and the composite core 101. To keep the composite core 101 from slipping out of the splice or dead end, the frictional force should be the same or greater than the tensional force. To maintain a tensional force of 40,000 pounds, the splice or dead end must apply a frictional force of 40,000 pounds or more. A frictional force is a function of the area under contact, the compressive force of the contact, and the coefficient of friction. Frictional force is calculated according to the equation below:

Frictional Force=(Coefficient of Friction)×(Compressive Force)×(Area)

As stated before, the frictional force should be equal to or greater than the tensional load on the cable 100. Thus, the frictional force should be at least 40,000 pounds. For the purposes of this embodiment, the Coefficient of Friction will be assumed to be 1. The composite core 101 of the ACCC cable 100 may be able to withstand a compressive force up to 10,000 pounds. For safety purposes, a lesser compressive force of 4,000 pounds may be used. The area under contact is the product of the length of the composite core 101 set in the splice or dead end times the outside circumference of the composite core 101. The circumference of a composite core 101, with a 0.371 outside diameter, is around 1.17 inches. The amount of frictional force may be adjusted by placing more or less of a length of the composite core 101 under compression. In this example, the length under compression could be 12 inches. As an example, twelve inches of the composite core 101, with a circumference of 1.17 inches, would need to be compressed 2850 pounds to achieve 40,000 pounds of frictional force. One skilled in the art will recognize how to apply these formulas to determine how to modify the dead ends and splices according to the present invention. In preliminary tests, the splice of the present invention, with similar dimensions, was able to withstand a tensional force of over 42,000 pounds.

Collet-Type Splice

The present invention relates to several fittings used to splice the ACCC reinforced cables 100. The main load bearing element of the ACCC cable 100 is the composite core 101. Therefore, it is advantageous to have a splice apparatus that can hold together the composite cores 101 of the ACCC cables 100. Beyond holding together the composite cores 101, the splice should provide an electrical junction between the two or more ACCC reinforced cables 100.

Collet-Type Fittings

Figure 2A:
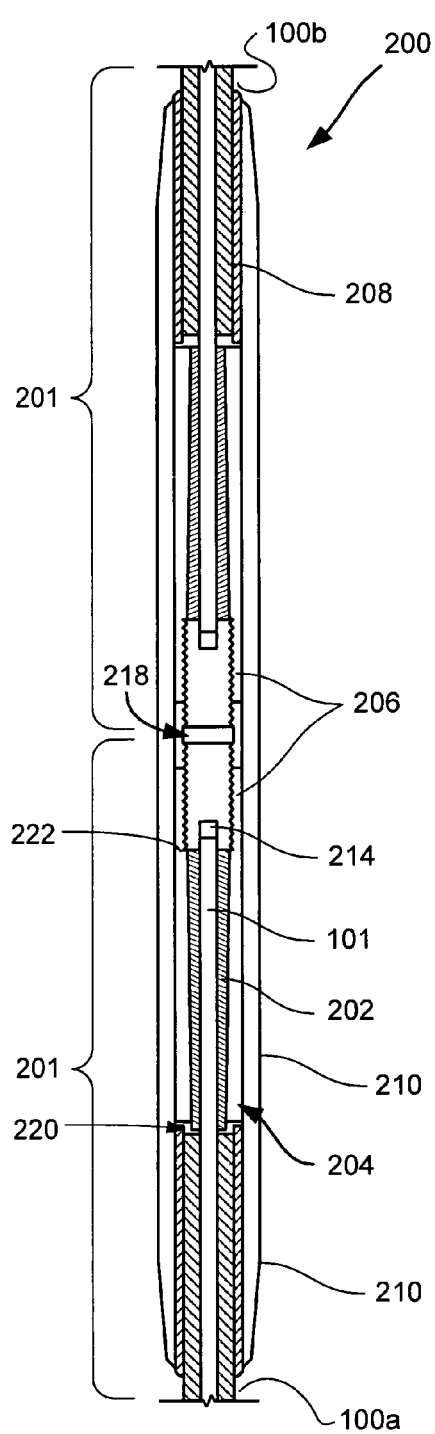
FIG. 2A through FIG. 2C are cross-sectional views of one embodiment of a collet-type splice and its corresponding elements according to the present invention.
Figure 2B:
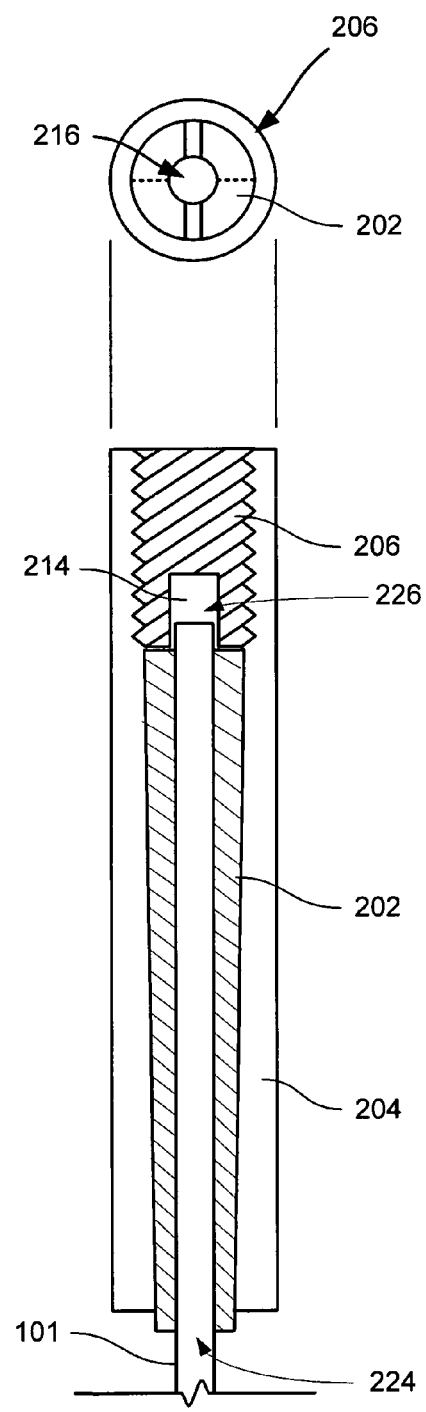
Figure 2C:
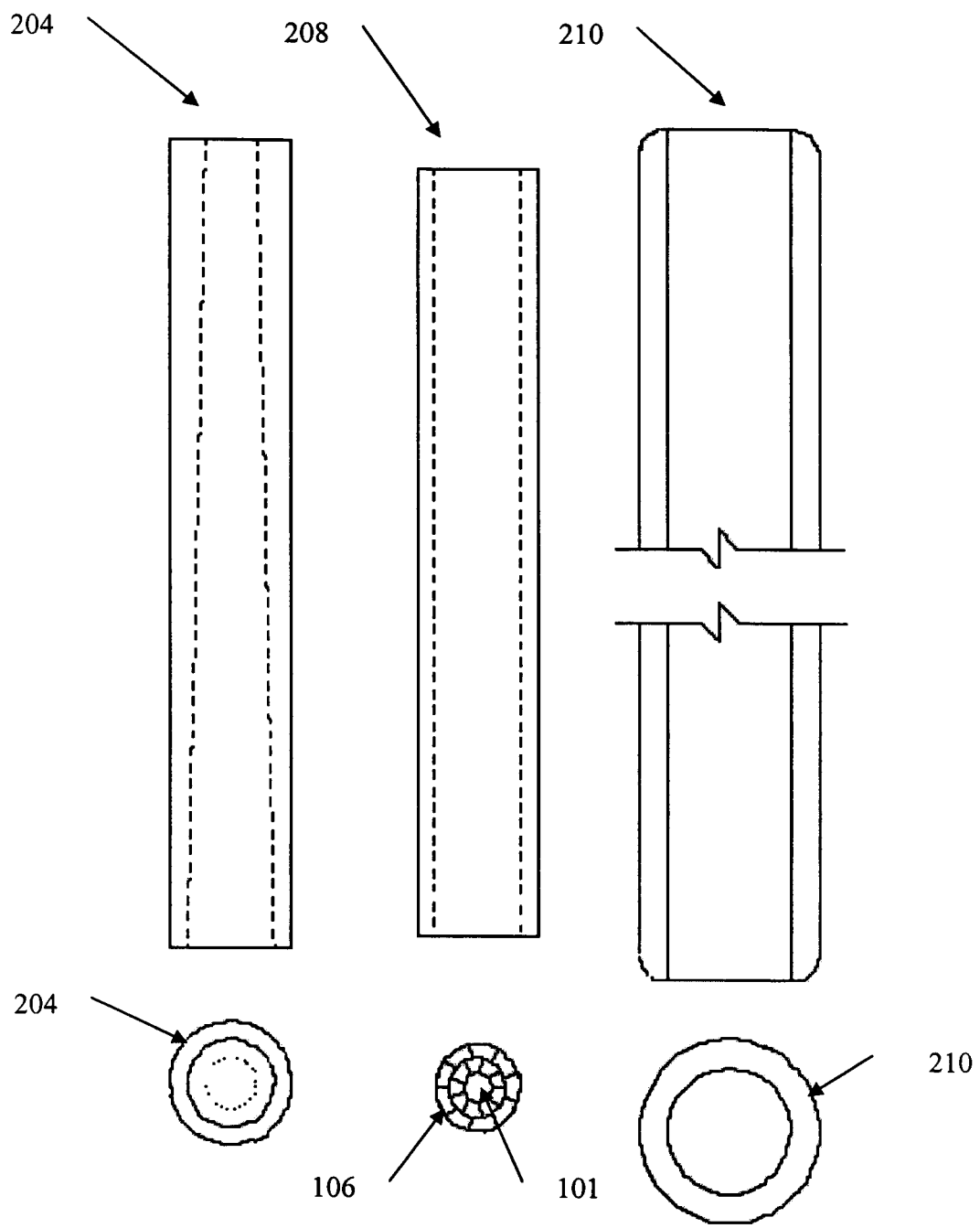

An embodiment of a collet-type splice is shown in FIG. 2A through FIG. 2C. The embodiment of the collet-type splice 200 includes two collet-type fittings 201 coupled by a connecting device 218. In this embodiment, the collet-type fitting 201 may include, but is not limited to, a collet 202, a collet housing 204, at least one compression implement 206. In further embodiments, the collet-type fitting 201 may also include an aluminum filler sleeve 208 and the collet type splice 200 may include an aluminum housing 210, which may cover the two collet-type fittings 201 and the connecting device 218. In the embodiment presented in the drawings, the compression element 206 and the connecting device 218 are formed from a single piece. However, one skilled in the art will recognize other embodiments where these elements are formed from separate parts. The elements of the collet-type fitting 201 function to mate with the composite core 101 of the ACCC cable 100 and compress the collet 202 such that friction holds the composite core 101. Each element will be explained further below.

The collet 202 is a structure that can be compressed under great pressure. In one embodiment, the collet 202 may be a conical piece with a lumen 214 concentrically oriented along the length of the collet 202. The lumen 214 accepts the composite core 101. The outer diameter of the collet 202 increases from a first end 220 of the collet 202 to a second end 222, but the interior radius of the lumen 214 remains constant. While the collet 202 is preferably formed from two or more sections, it is contemplated that the collet 202 may be formed by one or more sections. The outside slope or change in diameter from the first end 220 to the second end 222 of the collet 202 should be neither too shallow nor too steep. If the slope is too shallow, the collet 202 may be forcibly pulled through the end of the collet housing 204. Likewise, if the slope is too steep, the collet 202 will not slide within the collet housing 204 and apply increasing compressive forces on the composite core 101. In an exemplary embodiment, the collet 202 has an outside radius at the first end 220 of 0.326 inches and an outside radius at the second end 222 of 0.525 inches.

A collet 202 may be made from any material that can be formed into an appropriate shape and be used to put compressive forces on the composite core 101. Examples of such materials may include, but are not limited to, semi-malleable metals or polymers that can compress. One embodiment of the collet 202 is made from aluminum. The aluminum provides enough malleability to form around the composite core 101 during compression but maintain its general shape with the collet-housing 204.

The collet 202 provides a lumen 214 to mate with the composite core 101. The lumen 214 provides the female end of the mate with the composite core 101. In one embodiment, the lumen 214 perfectly fits the composite core 101. In essence, the inside shape and size of the lumen 214 is the same as the outside shape and size of the exposed composite core 101. FIG. 2 shows the collet 202, its corresponding lumen 214, and the composite core 101 having a generally circular cross section. However, the composite core 101, the collet 202, and the lumen 214 may have other shapes for cross sectional profiles.

In the exemplary embodiment shown in FIG. 2A though FIG. 2C, the lumen 214 extends within the collet 202 concentrically along the length of the collet 202. In the embodiment shown, there are two separate and distinct collets 202, with a connecting rod 218 separating and connection the two collets 202.

Another element of the collet-type fitting 201 is the collet housing 204. The collet housing 204 provides an enclosure for the collet 202. The collet housing 204 should have the same general inside shape as the outside shape of collet 202 and allow the collet 202 to fit inside the collet housing 204. In an exemplary embodiment, the collet housing 204 is a tubular piece with a funnel-shaped interior as shown in FIG. 2B. However, the invention is not limited to that one embodiment but may assume any shape that can encapsulate the collet 202. The collet housing 204 causes the collet 202 to further compress around and onto the composite core 101 as the collet 202 slides further into the collet housing 204, as will be explained in more detail hereinafter. Thus, the collet housing 204 must maintain its shape when the collet 202 is being compressed and pressing on the interior walls of the collet housing 204.

The collet housing 204 may be made of various rigid materials. The materials may include, but are not limited to, composites, graphite, hardened metals, or other sufficiently rigid and strong materials. In an exemplary embodiment, the collet housing 204 is formed from steel. The collet 202 and the collet housing 204 should be made from materials that allow the collet 202 to slide within the collet housing 204 without binding.

The collet housing 204 provides openings to allow the collet 202 to mate with the composite cores 101. The embodiment shown has a first open end 226 and a second open end 224. In addition, the collet housing 204 also can provide a mating for the compression implement 206. The mating with the compression implement 206 allows the initial compression of the collet 202 against the composite core 101 by driving the collet 202 down into the collet housing 204.

The compression implement 206 is the device or means of compressing the collet 202. Thus, the compression implement 206 is any mechanical, electrical, pneumatic, or other device that can compress the collet 202. In an exemplary embodiment, the compression implement 206 is a compression screw 206 that threads into the inside of the collet housing 204, see FIG. 2A. However, in other embodiments the compression implement 206 may use other devices and openings to compress the collet 202. Hereinafter, the compression implement 206 will be described as a compression screw 206, but the invention is not meant to be limited to that one embodiment.

The compression screw 206 is the threaded implement that can engage the grooves 203 as shown in FIG. 3 in the collet housing 204. While a screw 206 is shown, the compression implement 206 may also be a nut, which is an independent element from the connecting rod 218. The compression screw 206 or compression nut 206 can have a hollow center 216 or a hollow cavity. This hollow center or cavity 216 can allow the composite core 101 to pass through the compression nut 206 or into the compression screw 206. The compression screw 206 can have a series of threads along the outside surface of the screw 206. These threads can attach the screw 206 to the collet housing 204, which has related grooves along the inside surface of the housing 204. As will be evident to one skilled in the art, the threads on one side of the connecting device 218 may rotate in the opposite direction (counterclockwise) from the threads on the other side of the connecting device 218. This configuration of the threads allows the connecting device 218 to be screwed into both collet-type fittings 201 simultaneously. By tightening the compression screw 206, a compressive force is applied to the collet 202. This compressive force causes a compressive and frictional area of contact between the collet 202 and the composite core 101. The frictional contact extends along the length of the lumen 214 and the composite core 101 that is placed inside the lumen 214. It is the compressive and frictional forces that hold the composite core 101 in the collet 202. The edge of the lumen at the first end 220 may have a chamfer or bevel to prevent any force concentration at the end of the collet 202.

As shown in FIG. 3, the tension in the cable 100 pulls the composite core 101 in the direction of arrow 302. An area of friction is developed along the lumen 214 between the composite core 101 and the collet 202. As the tension pulls the composite core 101 in the direction of the arrow 302, the composite core 101, connected to the collet 202 by the frictional area of contact, pulls the collet 202 further down into the collet housing 204, as is represented by arrow 304. The conical shape of the collet 202 and the funnel shape of the collet housing 204 create increased compression upon the composite core 101 because of the decreasing volume within the collet housing 204 in the direction of arrow 304. Thus, the frictional force increases proportionally with the increase in the compressive forces, which increase proportionally with the increase in tensional forces. The increased frictional force ensures that the composite core 101 does not slip out of the collet 202 when the tension increases.

Another possible component of the collet-type fitting 201 is a aluminum filler sleeve 208. The aluminum filler sleeve 208 can be inserted between the aluminum housing and the aluminum conductor 106 of the ACCC cable 100. This aluminum filler sleeve 208 is required if the collet housing 204 and the collet 202 need a larger outside diameter than the outside diameter of the ACCC cable 100. A larger outside diameter of the collet housing 204 allows the slope of the collet 202 to be steeper and less likely to be forced out of the collet housing 204 when pulled into the end of the collet housing 204. The aluminum filler sleeve 208 may be any shape to mate between the aluminum housing 210 and the ACCC cable 100. In the exemplary embodiment, the aluminum filler sleeve 208 is a tube. This aluminum filler sleeve 208 may be made from any conductive material. In the exemplary embodiment, the aluminum filler sleeve 208 is made from aluminum to match the conductor strands 106 wrapping the ACCC cable 100 and the aluminum housing 210. The aluminum filler sleeve 208 allows the electrical current to pass through the aluminum filler sleeve 208, into the aluminum housing 210, and into the next cable 100. The aluminum filler sleeve 208 may be crimped to the cable 100 using standard crimping techniques with forces that would not damage the composite core 101.

The collet-type fitting 201 may also include an aluminum housing 210. The aluminum housing 210 refers to any structure that functions as an electrical jumper between the first cable 100a and the second cable 100b. An aluminum housing 210 conducts and passes the electric current from one cable 100 to another. In one embodiment, the aluminum housing 210 may be a cable 100 that is crimped to the conductors 106 of the first cable 100a and the second cable 100b. In an exemplary embodiment, the aluminum housing 210 is another hollow cylinder or tube that can be slipped over the entire splice and contact the conductors 106 on both the first cable 100a and second cable 100b. The aluminum housing 210 may be any electrically conductive material that can carry the electric current from the first cable 100a, over the splice 200, to the second cable 100b. In the exemplary embodiment, the aluminum housing 210 is made from aluminum similar to that in the conductor strands 106 in the ACCC cable 100. The aluminum housing 210 may be crimped to both the first cable 100a and the second cable 100b using standard crimping techniques with forces that would not damage the composite core 101. This embodiment of the aluminum housing 210 is shown in FIG. 2 and is only exemplary.

The aluminum housing 210 may have various cross-sectional areas. In one embodiment, the cross-sectional area of the aluminum housing 210, at some point along the length of the aluminum housing 210, exceeds the cross-sectional area of the conductors 106 on the cables 100. For instance, the cross-sectional area of the aluminum housing 210 may be twice the cross-sectional area of the cable conductors 106. By increasing the cross-sectional area of the aluminum housing 210, the operating temperature of the aluminum housing 210 can be kept lower than the cable conductors 106. This lower temperature protects the collet 202 and other collet-type fitting 201 parts from damage due to high operating temperatures.

A Method to Splice Together Two ACCC Cables

Figure 5:
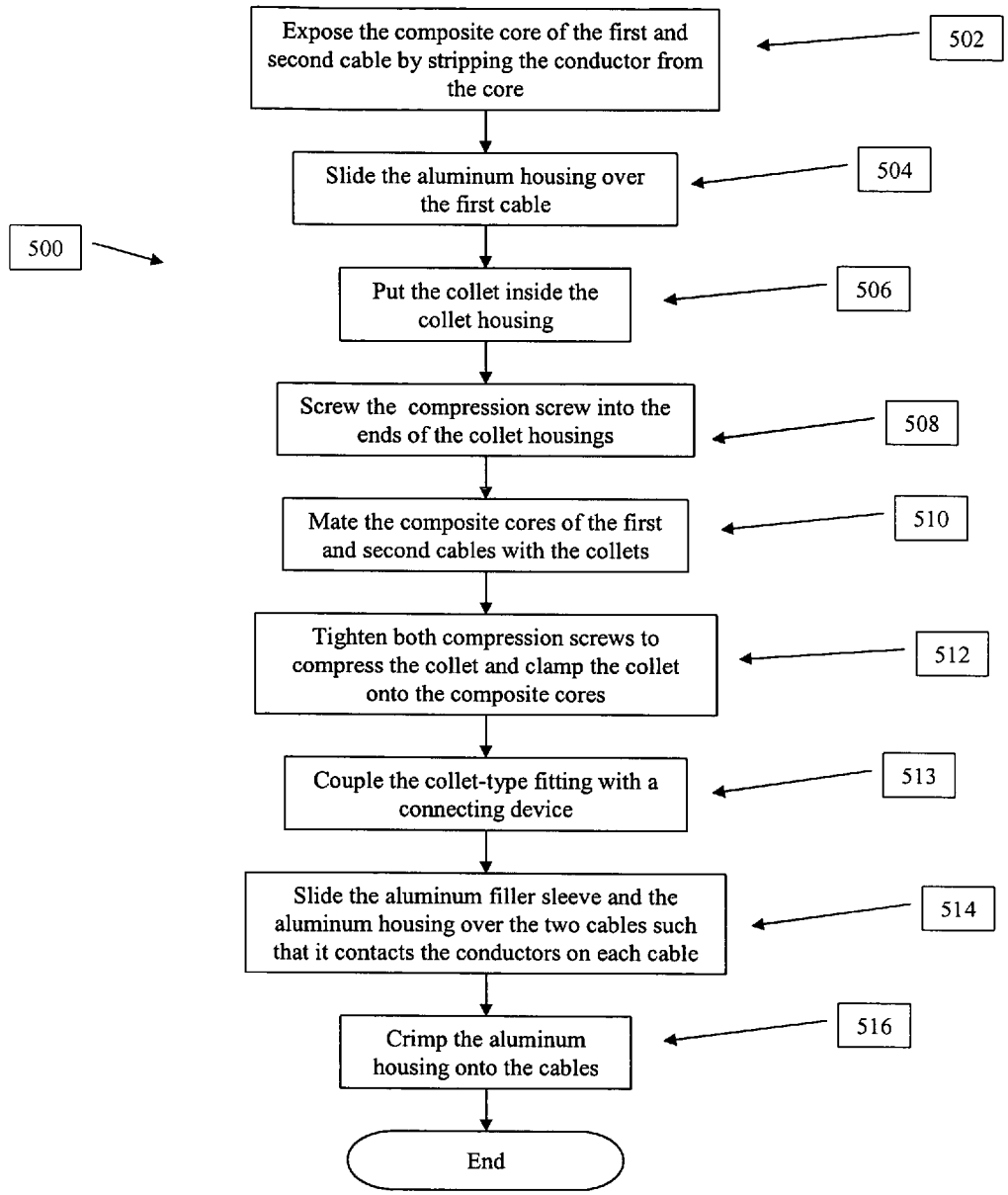
FIG. 5 shows one embodiment of a method for splicing two composite core cables according to the present invention.

One embodiment of the method 500 to splice two ACCC cables 100 is shown in FIG. 5. First, the composite core 101 of the first cable 100a and second cable 100b can be exposed 502 by stripping away the conductors 106 encasing the composite cores 101. Stripping the conductors 106 may be done by a stripping tool. These tools and methods of stripping wire are well known in the art and will not be explained further.

The collet 202 may be inserted 506 into the collet housing 204 and an aluminum filler sleeve may be slipped over the conductor of each cable 100. The aluminum housing 210 may also be slipped 504 over one of the cables 100. This step should be completed before the collet-type fittings 201 are coupled. Once the fittings 201 are coupled, the only method of putting on the aluminum housing 210 would be to slip it over the entire length of one of the cables 100 until it reaches the splice. However, other embodiments of the aluminum housing 210 may be placed over the splice later in the process.

The composite cores 101 can then be inserted 510 into the lumen 214 of the collet 202. Inserting the composite cores 101 entails the slipping of the cores 100 into their respective lumen 214. The core 100 may not reach the end of the collet 202 or may extend beyond the end of the collet 202.

To create the compression fit and frictional hold on the composite core 101, the collet 202 is compressed. The compression implement 206 is used to squeeze the collet 202 into the collet housing 204. In the exemplary embodiment, the compression screw 206 is threaded 508 into the collet housing 204 and then tightened 512, which presses the collet 202 further into the collet housing 204. The collet 202 tightens around the composite core 101 along the length of the composite core 101 inserted into the collet 202. Threading the screw 206 into the collet housing 204 can be done before mating the composite core 101 with the collet 202. The collet 202 in turn applies compressive forces on the composite core 101 of each cable 100.

In one embodiment, the aluminum filler sleeve 208 can be placed between the aluminum housing 210 and the cable conductors 106. The aluminum filler sleeve 208 and the aluminum housing 210 may be crimped 516 onto one or both of the cables 100. The crimping of the aluminum housing 210 ensures that it will not migrate from its position over the splice 200. In other embodiments, the aluminum filler sleeve 208 and the aluminum housing 210 may be welded to one or both conductors 106 on the two cables 100. In still another embodiment, the aluminum filler sleeve 208 and the aluminum housing 210 may be glued or adhesively attached to a cable 100. Once attached, the aluminum housing 210 can carry electric current over the splice 200, with help from the aluminum filler sleeve 208.

An exemplary composite core 101 with a diameter of 0.371 inches, may withstand compressive forces of about 10,000 psi. When the collet 202 is compressed by the compression screw 206, the compressive forces should be below the compression limit of the composite core 101. Thus, the collet 202 should be compressed to less than about 10,000 psi. In an exemplary embodiment, the collet 202 is compressed to 4,000 psi for a splice 200 on an ACCC cable 100 that replaces a Drake style ACSR conductor. These calculations are only exemplary but generally follow the calculations presented above.

An electrical cable 100 must be able to maintain adequate tension. The tension in the line prevents sag. As a standard, tension in most Drake style ACSR cables is around 40,000 pounds. However, the present invention allows higher tension loads along the splice 200. The splice 200 can handle tensions of around 43,000 pounds. Thus, the splice 200 maintains a three (3) times safety factor. In addition, the collet-type splice 200 increases the tension if the composite core 101 begins to slip from the splice 200 and pulls the collet 202 further into the collet housing 204.

Other configurations of the above elements is contemplated and included in the invention. In addition other elements may be added to the splice 200 and are include in the invention.

Dead End Fittings

Figure 4A:
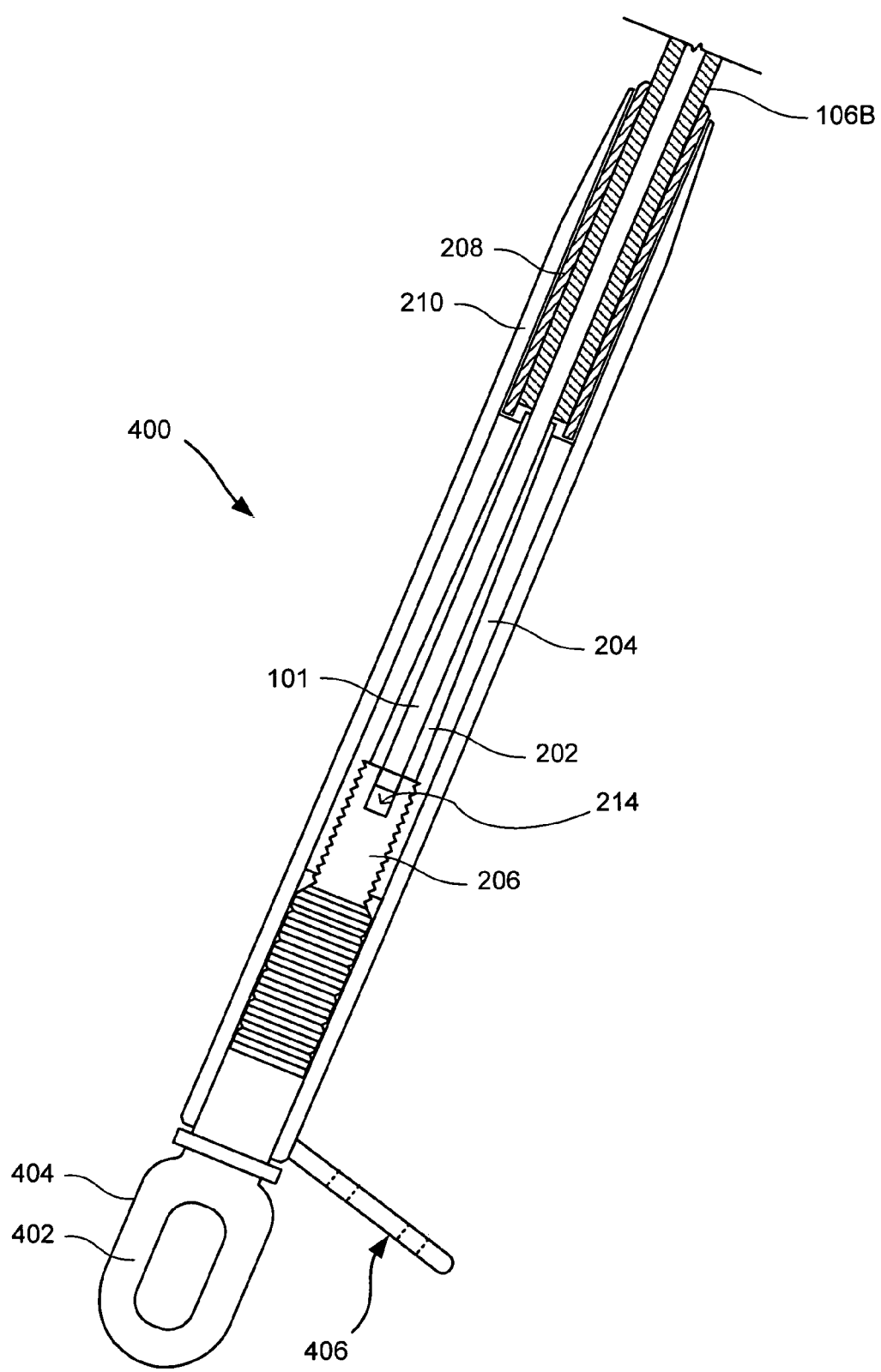
FIG. 4A through FIG. 4B are cross-sectional views of one embodiment of a collet-type dead end and some of its corresponding elements according to the present invention.
Figure 4B:
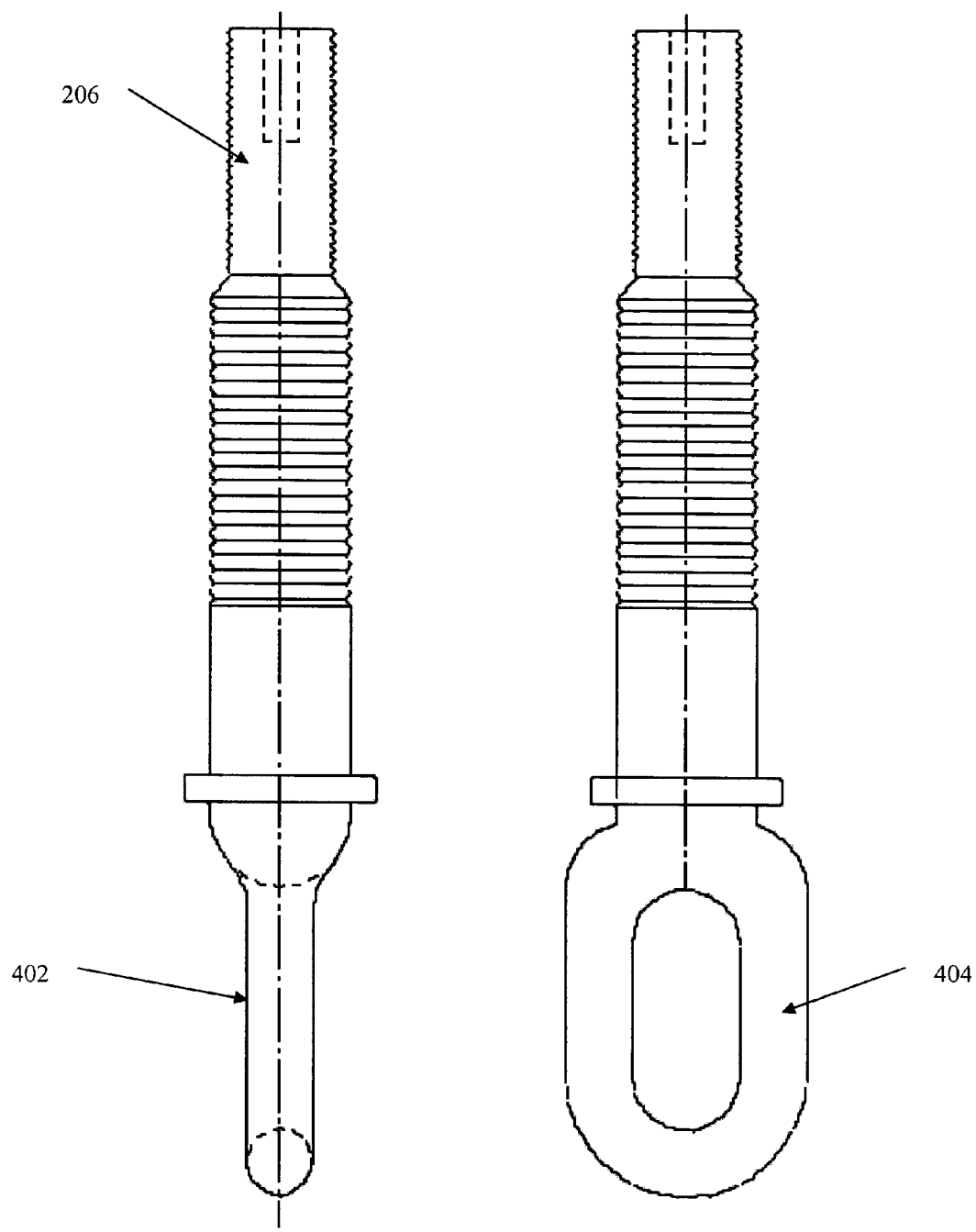

The present invention also relates to dead ends 400, as shown in FIG. 4A and FIG. 4B, used to terminate the ACCC reinforced cables 100 described herein. As explained, the main load bearing element of the ACCC cable 100 is the composite core 101. Therefore, it is advantageous to have a dead end 400 that can hold the composite core 101 of the ACCC cable 100. The dead ends 400 are similar and function similarly to the splice fittings 200. One skilled in the art will recognize the similarities and how to modify a collet-type fitting 201 to function in a dead end 400. Therefore, the collet-type fitting 201 will not be explained again as it relates to dead ends 400. Rather, the differences between the splice 200 and the dead end 400 will be explained hereinafter.

One embodiment of the collet-type dead end 400 is shown in FIG. 4A and FIG. 4B. In this embodiment, the collet-type dead end 400 may include, but is not limited to, a collet 202, a collet housing 204, a connector 404, and at lease one compression implement 206. In the embodiment shown, the compression implement 206 and the connector 404 are formed as a single piece. In further embodiments, the collet-type dead end 400 may also include an aluminum filler sleeve 208 and an aluminum housing 210. These elements of the collet-type dead end 400 function to mate with the composite core 101 of the ACCC cable 100, compress the collet 202 such that friction holds onto the composite core 101 and anchor the dead end 400 to a structure.

A component of the collet-type dead end 400 may be a connector 404. The connector 404 may be any mechanical device that anchors the dead end 400 and the cable 100 to a structure. In the embodiment shown, the connector 404 is an eye bolt or clevis. In other embodiments, the connector 404 may include, but is not limited to, hooks that can be set in a hole, plates that can be screwed to a set of bolts, or bolts that can screw to a female mate. One skilled in the art will recognize the various types of connectors 404 that may be used. All of the connectors 404 are incorporated into this invention. Hereinafter, the connector 404 will be described as an eye bolt 402, but the description is not meant to limit the invention to that one embodiment.

The eye bolt 402 may be formed with the compression screw 206 and thread into the collet housing 204. By screwing into the threads of the collet housing 204, the eye bolt 402 may be incorporated into the mechanical couple with the cable 100. Thus, when the eye bolt 402 is anchored to a structure, the components that hold the cable 100 are also anchored. The eye bolt 402 can be anchored to any type of structure. The structure may include, but is not limited to, a pole, a building, a tower, or a substation.

The cables 100 and the collet-type dead end 400, once completely mated, form a cable terminal 400. After the cable terminal 400 is made, an electrical jumper 406 may be installed, and the electrical circuit connected to the end user using the jumper 406.

A Method to Terminate an ACCC Cable

Figure 6:
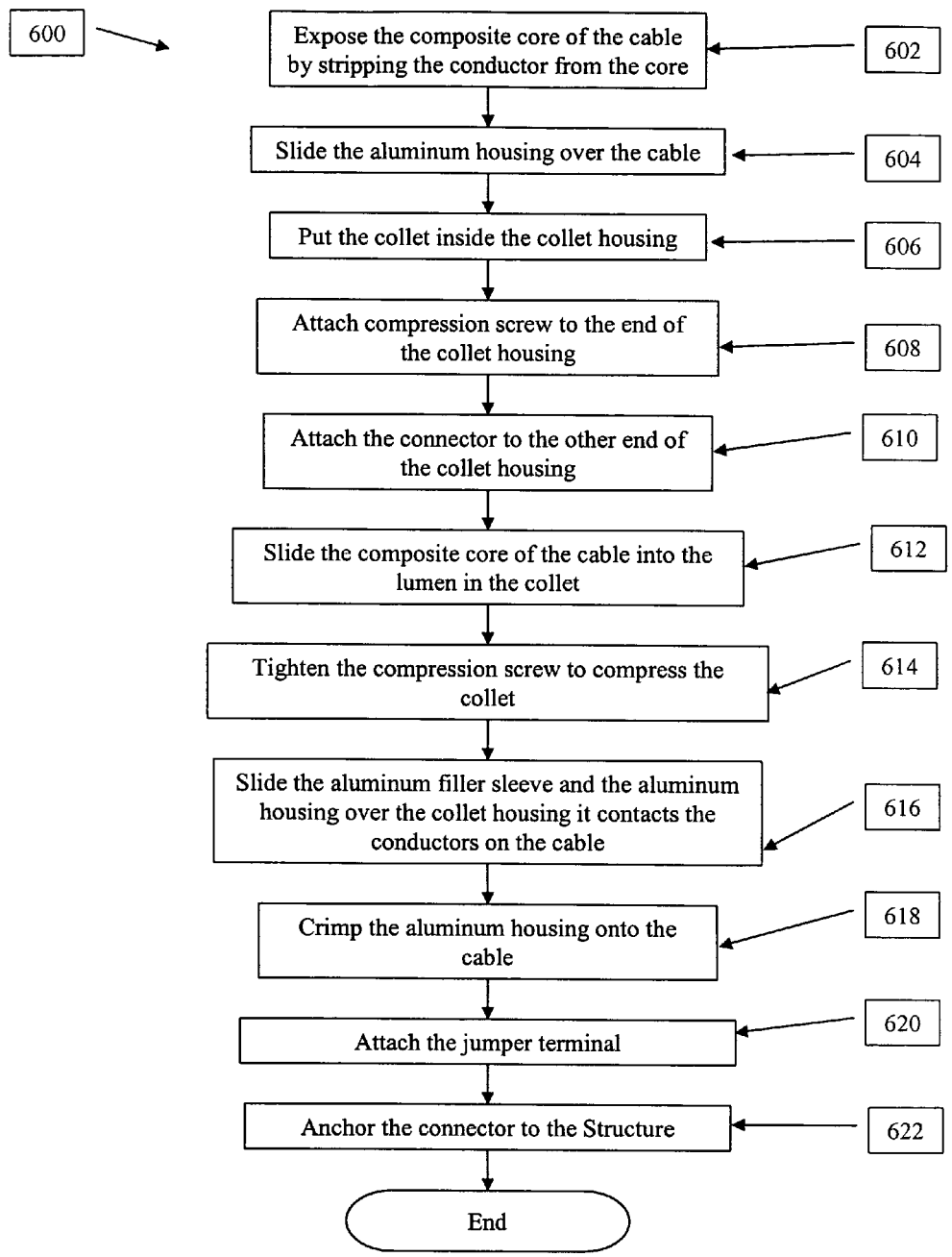
FIG. 6 shows one embodiment of a method for terminating a composite core cable according to the present invention.

One embodiment of the method 600 to terminate an ACCC cable 100 is shown in FIG. 6. First, the composite core 101 of the cable 100 can be exposed 602 by stripping away the conductor 106 encasing the composite core 101. Stripping the conductor 106 may be done by a stripping tool. These tools and methods of stripping wire are well known in the art and will not be explained further.

The collet 202 may be inserted 606 into the collet housing 204. The aluminum housing 210 may also be slipped 604 over the cable 100. In one embodiment, the aluminum filler sleeve may also be placed over the cable 100. The connector 404 may be attached 610 to the second end 222 of the collet housing 204. The connection can be made by screwing the connector 404 into the end 222 of the collet housing 204. At this point, the collet 204 is prepared to receive the composite core 101. The composite core 101 can be inserted 612 into the lumen 214 of the collet 202. Inserting the composite core 101 entails the slipping of the core 100 into the lumen 214, possibly until the core 100 reaches the end of the collet 202.

To create the compression fit and frictional hold on the composite core 101, the collet 202 is compressed. The compression implement 206 is used to squeeze the collet 202. In one embodiment, the compression screw 206 is threaded 608 into the collet housing 204 and then tightened 914, which presses on the collet 202. The collet 202 in turn applies compressive forces on the composite core 101 of the cable 100.

In one embodiment, the aluminum filler sleeve 208 and the aluminum housing 210 can be slipped 616 over the dead end 400. The aluminum filler sleeve 208 and the aluminum housing 210 may be crimped 616 onto the cable 100. The crimping of the aluminum filler sleeve 208 and the aluminum housing 210 ensures that it will not migrate from its position over the dead end 400. In other embodiments, the aluminum filler sleeve 208 and the aluminum housing 210 may be welded to a conductor 106. In still another embodiment, the aluminum filler sleeve 208 and the aluminum housing 210 may be glued or adhesively attached to the cable 100. Once attached, the aluminum housing 210 can carry electric current over the dead end 400.

In an exemplary embodiment, a jumper terminal 406 may be attached to the aluminum housing 210. In one embodiment, the jumper terminal 406 is bolted to the aluminum housing 210. The jumper terminal 406 may also be welded or adhesively attached to the aluminum housing 210. In still another embodiment, the jumper terminal 406 and the aluminum housing 210 are formed as a single unitary part. One skilled in the art will recognize other methods of attaching the aluminum housing 210 to the jumper terminal 406. The jumper terminal 406 provides a means of connection between the aluminum housing 210 and the end user.

The dead end 400, after the connector 404 and the core 100 are attached, can be anchored 622 to a structure. Anchoring the dead end 400 may include slipping the eye of the eye bolt 404 or clevis over some hook. The structure may be a pole or a building. In one embodiment, the eye is slipped onto a hook; the jumper terminal 406 is connected to a wire that feeds the electrical current into a nearby building. One skilled in the art will recognize other structures to anchor to and other methods of completing such attachments.

The invention claimed is:

1. A collet-type splice to connect a first aluminum conductor composite core reinforced cable and a second aluminum conductor composite core reinforced cable, each cable having a composite core surrounded by a conductor, comprising:
   a. two or more collet-type fittings, each fitting comprising:
      i. a collet having at least one lumen to mate with the composite core from the cable;
      ii. a collet housing, wherein the collet housing mates with the collet to compress the collet, and wherein the collet housing has an opening to expose the at least one lumen to enable the collet to mate with the composite core of the cable; and
      iii. a compression implement that couples with the collet housing, wherein the compression implement compresses the collet inside the collet housing, and wherein compressing the collet exerts a compressive and frictional force on the composite core of the cable; and
   b. at least one connecting rod that couples the two or more collet-type fittings together.

2. A collet-type splice according to claim 1, wherein the collet is an elongated conical body having a first end comprising a first outer radius and a second end comprising a second outer radius, wherein the first outer radius of the collet is larger than the second outer radius.

3. A collet-type splice according to claim 1, wherein the at least one lumen extends concentrically along a length of the collet from the first end to the second end.

4. A collet-type splice according to claim 3, wherein the at least one lumen mates with the composite core of the cable.

5. A collet-type splice according to claim 1, wherein the collet is made from two or more sections.

6. A collet-type splice according to claim 1, wherein the collet housing is a tube comprising a funnel-shaped interior that allows the collet to fit inside the collet housing.

7. A collet-type splice according to claim 1, wherein the compression implement compresses the collet by pressing the collet into the collet housing.

8. A collet-type splice according to claim 1, wherein the collet housing is made from steel.

9. A collet-type splice according to claim 1, wherein the compression implement is a compression screw that threads into the collet housing and wherein tightening the compression screw compresses the collet.

10. A collet-type splice according to claim 1, further comprising an aluminum housing that couples with each of the two or more collet-type fittings and electrically connects the conductor of the first cable with the conductor of the second cable.

11. A collet-type splice according to claim 10, wherein the aluminum housing has a greater cross sectional area than the conductor, on the first cable or the second cable, to lower operating temperatures across the splice.

12. A collet-type splice according to claim 10, wherein the aluminum housing is a tube.

13. A collet-type splice according to claim 10, further comprising an aluminum filler sleeve inserted between the conductor on the cable and the aluminum housing to ensure that the electrical current is passed by the aluminum housing.

14. A method to splice together a first aluminum conductor composite core reinforced cable and a second aluminum conductor composite core reinforced cable, each cable having a composite core surrounded by a conductor, comprising:
   a. exposing a composite core of a first cable;
   b. exposing a composite core of a second cable;
   c. inserting the composite cores of the first and second cables into separate collet-type fittings, the insertion process comprising:
      i. inserting the composite core of each cable into a first and a second collet;
      ii. compressing each collet to hold frictionally each composite core; and
   d. coupling a connecting rod to each of the separate collet-type fittings to hold the collet-type fittings together.

15. A method to splice according to claim 14, further comprising mating each collet with a collet housing.

16. A method to splice according to claim 14, wherein compressing the collet includes:
   a. threading a compression screw into a collet housing; and
   b. tightening the compression screw to compress the collet into the collet housing.

17. A method to splice according to claim 14, further comprising slipping an aluminum housing over the splice to conduct electricity from the conductor of the first cable to the conductor of the second cable.

18. A method to splice according to claim 17, wherein the aluminum housing is crimped to one of the first cable, the second cable, or both the first cable and the second cable to keep the aluminum housing in place over the splice.

19. A method to splice according to claim 17, further comprising inserting an aluminum filler sleeve between the conductor of either the first cable or the second cable and the aluminum housing.

20. A method to splice according to claim 14, wherein a compressive force of less than 10,000 psi is placed on the core.

21. A method to splice according to claim 14, wherein a compressive force of about 4,000 psi is placed on the core.

22. A method to splice according to claim 14, wherein the splice can maintain a tension in the cable of greater than 10,000 pounds.

23. A method to splice according to claim 14, wherein the splice can maintain a tension in the cable near 40,000 pounds.

24. A spliced electrical cable, comprising:
  a. a first span of aluminum conductor composite core reinforced cable, the cable having a composite core surrounded by a conductor;
  b. a second span of aluminum conductor composite core reinforced cable, the cable having a composite core surrounded by a conductor;
  c. a splice, comprising:
    i. a first collet-type fitting coupled to the first span of aluminum conductor composite core reinforced cable;
    ii. a second collet-type fitting coupled to the second span of aluminum conductor composite core reinforced cable;
    iii. wherein each collet-type fitting comprises:
      (1) a collet having at least one lumen to mate with the composite core from the cable;
      (2) a collet housing, wherein the collet housing mates with the collet to compress the collet, and wherein the collet housing has an opening to expose the at least one lumen to enable the collet to mate with the composite core of the cable; and
      (3) a compression implement that couples with the collet housing, wherein the compression implement compresses the collet inside the collet housing, and wherein compressing the collet exerts a compressive and frictional force on the composite core of the cable; and
    iv. a connecting device that couples the first collet-type fitting to the second collet-type fitting.

25. A spliced electrical cable according to claim 24, wherein the collet is an elongated conical body having a first end and a second end, wherein a lumen extends concentrically along a length of the collet.

26. A spliced electrical cable according to claim 25, wherein the lumen mates with the composite core of the cable.

27. A spliced electrical cable according to claim 24, wherein the collet is made from two or more sections.

28. A spliced electrical cable according to claim 24, wherein the collet housing is a tube with a funnel-shaped interior that accepts the collet.

29. A spliced electrical cable according to claim 24, wherein the compression implement compresses the collet by pressing the collet into the collet housing.

30. A spliced electrical cable according to claim 24, wherein the collet housing is made from steel.

31. A spliced electrical cable according to claim 24, wherein the compression implement is a compression screw that threads into the collet housing, and wherein tightening the compression screw compresses the collet.

32. A spliced electrical cable according to claim 24, further comprising an aluminum housing that couples with each of the collet-type fittings and electrically connects the conductor of the first cable with the conductor of the second cable.

33. A spliced electrical cable according to claim 32, wherein the aluminum housing has a greater cross sectional area than the cross sectional area of the conductor to lower operating temperatures across the splice.

34. A spliced electrical cable according to claim 32, wherein the aluminum housing is a tube.

35. A spliced electrical cable according to claim 32, further comprising an aluminum filler sleeve inserted between the conductor of the first and second cables and the aluminum housing to ensure that the electrical current is passed by the aluminum housing.

* * * * *